E. H. SCHMIDT.
COUPLING YOKE.
APPLICATION FILED OCT. 23, 1914.
1,259,299.
Patented Mar. 12, 1918.
3 SHEETS—SHEET 2.
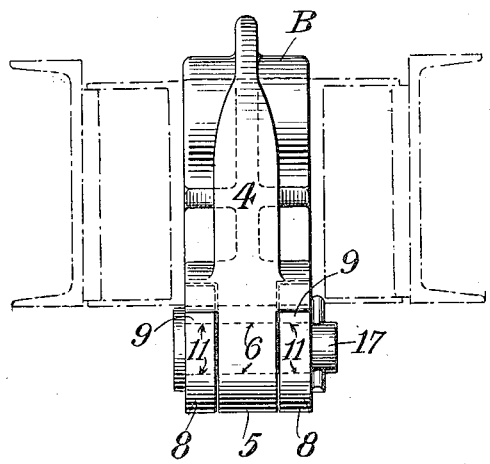
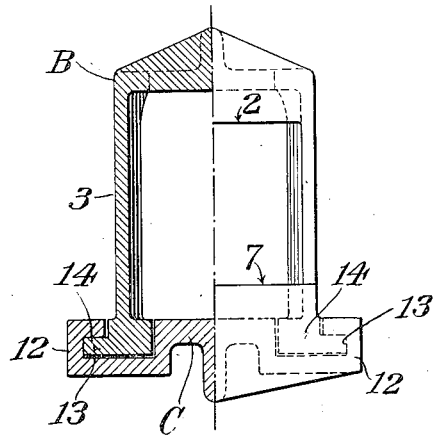
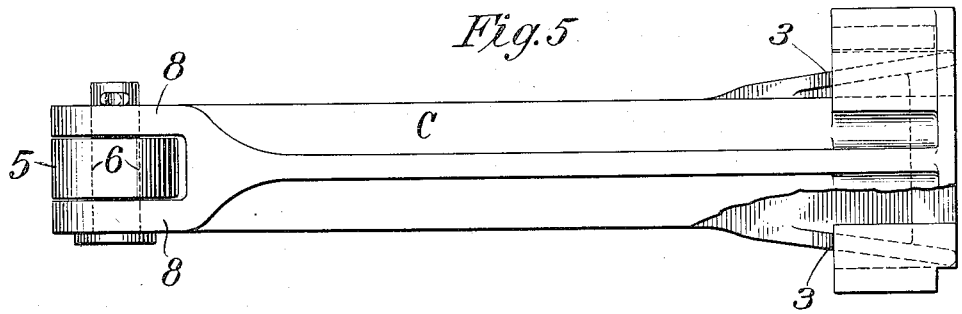
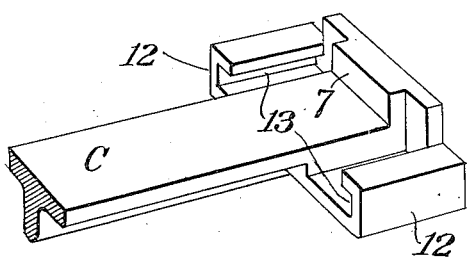
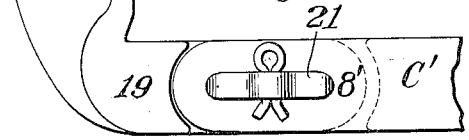
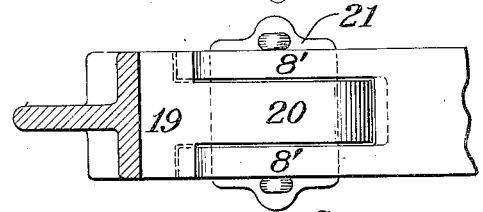
Witnesses:
Raphaël Netter
C. D. Morrill
Inventor
Ernest H. Schmidt
By his Attorney
Clarence D. Kent E. H. SCHMIDT.
COUPLING YOKE.
APPLICATION FILED OCT. 23, 1914.
1,259,299.
Patented Mar. 12, 1918.
3 SHEETS—SHEET 3.
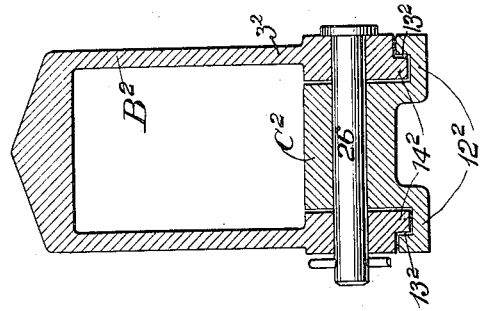
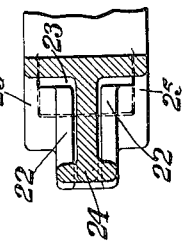
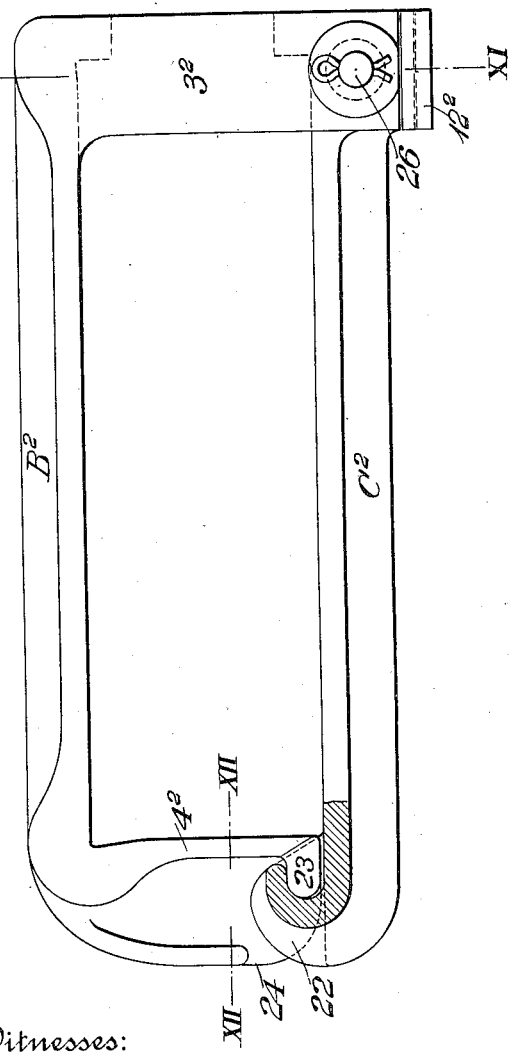
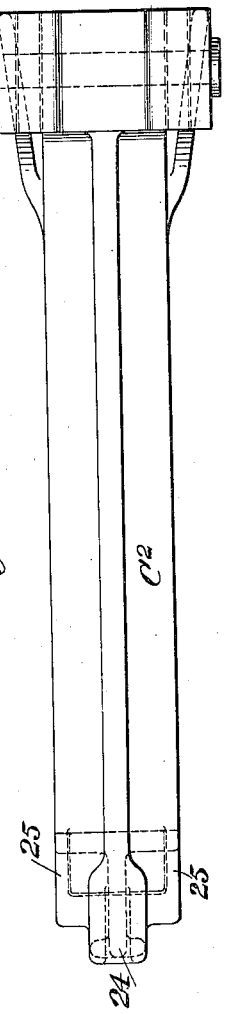
Witnesses:
Raphaël Netter
C D Morrill
Inventor
Ernest H. Schmidt
By his Attorney
Clarence D. Kent

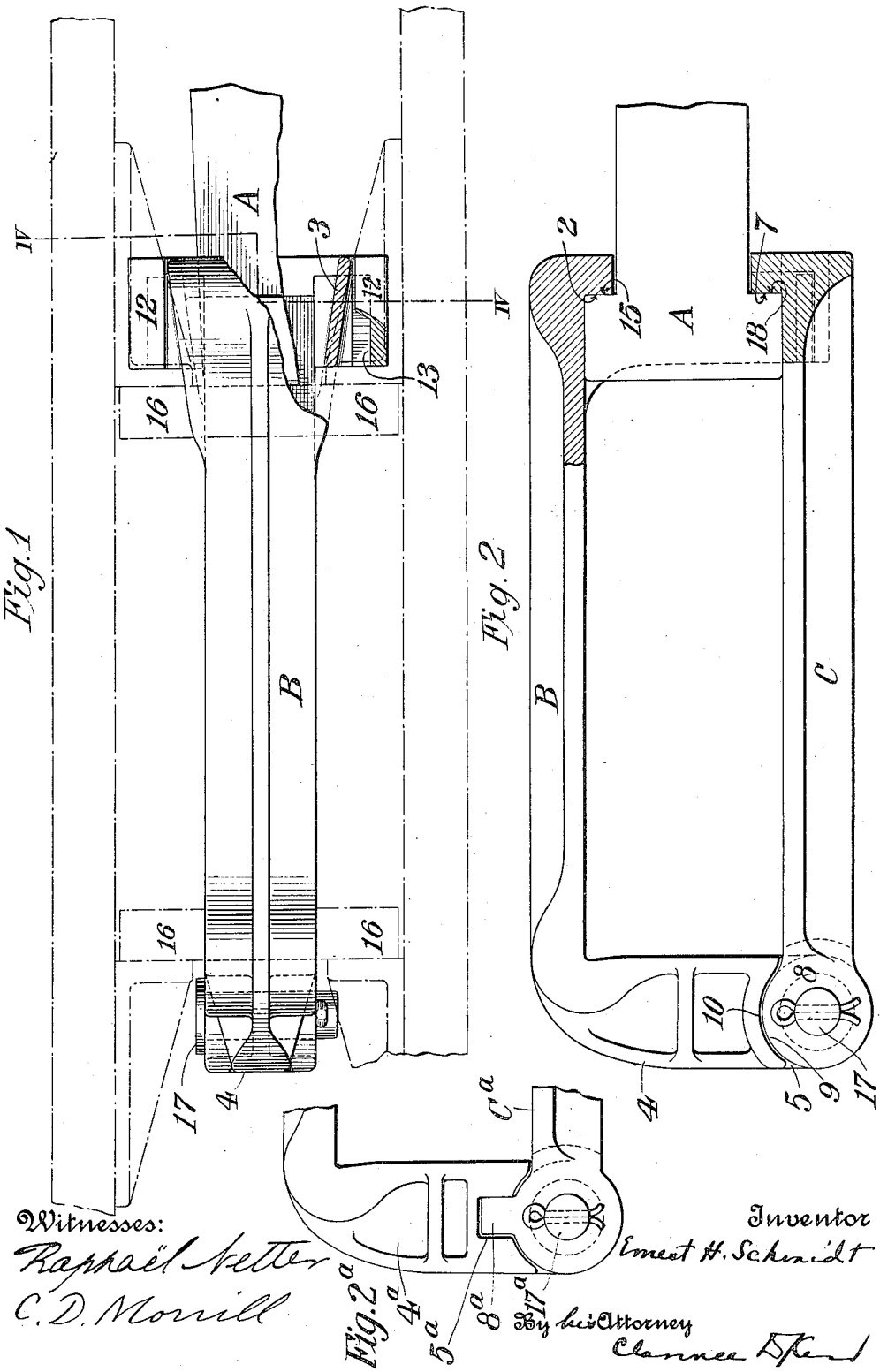

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO.

COUPLING-YOKE.

1,259,299.

Specification of Letters Patent.

Patented Mar. 12, 1918.

Application filed October 23, 1914. Serial No. 868,170.

*To all whom it may concern:*

Be it known that I, ERNEST H. SCHMIDT, a citizen of the United States, residing at Cleveland, Cuyahoga county, Ohio, have invented new and useful Improvements in Coupling-Yokes, of which the following is a specification, reference being had to the accompanying drawings, in which—

Figure 1 is a plan, partly in section, showing my improved yoke applied to the underframing of a car; Fig. 2 is a side elevation thereof partly in section; Fig. 2ª is an elevation similar to Fig. 2 containing a modification thereof; Fig. 3 is a rear elevation of the form shown in Figs. 1 and 2; Fig. 4 is a section on lines IV—IV of Fig. 1, partly in elevation; Fig. 5 is a bottom view thereof partly broken away; Fig. 6 is a detail of the forward end of the lower yoke arm; Fig. 7 is an elevation of a modified form of connection between the parts of the yoke; Fig. 8 is a plan thereof, partly in section; and Figs. 9, 10, 11 and 12 show respectively an elevation, a bottom view, a section on lines XI—XI of Fig. 9 and a section on lines XII—XII of Fig. 9 of a further modification of my invention.

My invention relates to yokes of the type in which either the coupler or the yoke or draft gear is removable independently and provides a strong, simple and convenient form of yoke, which can be readily connected to or disconnected from the coupler without necessitating the removal of either from the car. My invention also consists in the construction and coöperation of the parts, which I shall hereinafter describe and claim.

Referring to the drawings, A indicates a coupler butt, B the upper or main portion of the yoke, and C the bottom or lower arm of the yoke. The main portion B of the yoke has at its forward end a downwardly projecting lip 2 and at either side of the lip 2 downwardly extending webs 3. The rear end of the part B is formed into a vertically extending member 4, the lowermost extremity 5 of which is reduced in width and provided with an aperture 6. The lower or removable arm C of the yoke has an upwardly extending lip 7 at its forward end and a bifurcated jaw 8 at its rear end, which takes about the reduced lower end 5 of the portion 4 of the part B, and the faces 9 of which bear against the shoulders 10 on the portion 4. Through the jaw 8 are formed apertures 11 which are intended to be brought in register with the aperture 6 of the portion 4 of the part B. The forward end of the removable member C is also provided with laterally-extending flanges 12, 12, which have recesses 13 therein for the reception of laterally extending projections 14 on the lower ends of the webs 3. The yoke is applied to the car as follows:

The main portion B of the yoke is placed under the car and is held in position by jacks or other convenient means. The coupler butt A is then placed in position with the upper forward face 15 of the coupler liner block between the webs 3 and against the lip 2. With the liner block in this position the followers 16 are placed against the rear member 4 and against the rear face of the coupler butt, and the draft gear is then inserted between the followers 16. The lower arm of the yoke is then raised so that its flanges 12 are forward of the webs 3 and the projections 14 with which the webs are provided. The member C is then moved horizontally rearwardly, its body portion being between the webs 3. When the apertures 6 and 11 are brought into register, the headed bolt 17 may be inserted. As the member C is moved rearwardly the projections 14 on the webs 3 will engage the recesses 13 in the flanges 12 and will interlock therewith, as is shown in Fig. 4. The lower face 18 of the liner block will then bear against the lip 7, and the lips 2 and 7 are held from spreading away from each other by the interlocking engagement of the flanges 12 with the projections 14, and the two yoke members B and C will thus be firmly held against spreading, such as may be caused by the pull of the coupler butt against the lips 2 and 7. Sufficient looseness is provided in the fit between the projection 14 of the webs 3 and the recesses 13 of the flanges 12 so that the jaw portion 8 of the member C will pass the shoulders 10 on the portion 4 when being assembled, without straining any of the interlocking parts.

As is shown in Fig. 2ª, if desired, pulling lugs 8ª on the lower arm Cª coöperating with recesses 5ª in the member 4ª, may be employed to relieve the pin or bolt 17ª from strains during pulling.

In Figs. 7 and 8 I have shown a modification of my device, in which the portion 4' has at its lower extremity a forward extension 19 and a reduced portion 20 about which the jaws 8' of the member C' fit and which parts are suitably apertured for reception of a key 21 by which they are secured together.

A further modification of my invention is shown in Figs. 9, 10, 11 and 12, in which the lower arm C² at its rear end is bifurcated and is formed into upwardly turned hook shaped members 22, each of which engages a rearwardly extending projection 23 on either side of the flange 24 at the reduced lower extremity of the rear vertical portion 4² of the member B². The hook shaped members 22 have reinforcing webs 25, which bear against the outside faces of the projections 23, to prevent lateral motion of the member C². At its forward end the member C² has laterally extending flanges 12² in the upper faces of which are recesses 13² in which the downwardly extending projections 14² of the webs 3² are intended to be seated, which prevents spreading of the webs 3². The lower ends of the webs 3² and the forward end of the lower yoke arm C² also have registering apertures for reception of a headed pin or key 26, by which the forward end of the arm C² is supported. As the hook shaped members 22 and the projections 23 are of sufficient strength to take up the pulling stresses imposed upon the lower yoke arm C² it is not necessary to transmit any of such stresses through the pin 26 to the member B and hence the fit of the pin 26 may be sufficiently loose so that it will receive none of the pulling stresses. The lower yoke arm C² is disengaged, after removal of the pin 26, either by compressing the draft gear and moving arm C² first rearwardly so that the hook shaped members 22 will be free from engagement with the projections 23, or by lowering the forward end of the yoke arm until it is out of engagement with the coupler butt and then moving it rearwardly until the members 22 are out of engagement with the projections 23. It may then be lowered.

One of the advantages of my invention is that it permits the lateral removal of the pin or key while the yoke is attached to the car without necessitating the cutting away of the draft sills. A further advantage lies in the fact that the removal of the lower yoke arm does not interfere with the coupler carrier iron, since, in removing the lower yoke arm C, it is necessary to move it forward only so far as is necessary to disengage the projections 14 from the recesses 13 in the flanges 12, in which position the lower arm C can be lowered without interference with the remainder of the yoke, the draft rigging or the coupler, which permits free access to these parts.

Further, as the pin 17, connecting the parts B and C, is almost directly in line with the pull against the lip 7, there is little tendency for the lower yoke member C to bend under pulling stresses. I have also found that the pin or hook forms an efficient and practical means for holding the yoke and coupler in engagement, thus obviating the necessity of other securing members.

It is obvious that various modifications may be made in the constructions which I have shown and described herein without departing from my invention.

What I claim is:

1. A coupler yoke comprising two forwardly extending arms, said arms being secured together at their forward and rear ends, one of said securing means comprising a pin and slot connection and the other of said securing means comprising a projection and recess engagement of the parts, the lower arm being adapted to be disengaged by an initial longitudinal movement thereof without disturbing the draft rigging.

2. A coupler yoke having two parallel arms, the upper arm having at its front and rear ends depending members, one of said depending members having a longitudinally disposed slot and projection engagement with an end of the lower yoke arm, and the other of said depending members having a pin and slot engagement with the other end of the lower yoke arm, the lower yoke arm being adapted to be disengaged from the depending members by a longitudinal movement without disturbing the draft rigging.

3. A coupler yoke comprising two parallel arms, one arranged above the other, members depending from the ends of the upper yoke arm, hook shaped members on one end of the lower yoke arm engaging projections on one of said depending members, the other end of the lower yoke arm being secured to the other of said depending members by a pin seated in apertures in both arms, the hook-shaped members being adapted to be disengaged from the projections by a longitudinal movement of the lower yoke arm.

4. A coupler yoke comprising two parallel arms arranged in a vertical plane, the upper arm having at its forward end downwardly extending webs adapted to inclose the sides of a coupler liner block and at its rear end a downwardly extending portion, the lower yoke arm having a pulling engagement with the vertical extension and at its forward end having a projection and slot engagement with the lower ends of the webs depending from the upper arm to prevent spreading.

5. A coupler yoke having two parallel arms arranged in a vertical plane, the upper yoke arm having at its forward end downwardly extending webs, lateral extensions on the lower ends of the webs engaging lateral recesses in the lower yoke arm, the said recesses being adapted to be engaged and disengaged from said extensions by a longitudinal movement of the lower yoke arm, and means for operatively connecting the rear ends of the two arms.

6. A coupler-yoke, comprising a plurality of arms, each of said arms having a shoulder engaging a forward face of a coupler liner block and being adapted to receive pulling strains therefrom, the said arms being connected at one end by a removable member and by an interlocking engagement with each other at their other ends, the lower arm being disengageable from the coupler liner block and from its interlock with the upper arm by an initial longitudinal movement without disturbing the draft-rigging.

7. A coupler yoke comprising a body portion consisting of an upper yoke arm having at its rear end a downward extension forming a bearing for a follower and at its forward end downwardly-extending webs, and a removable member consisting of a lower yoke arm having disengageable connections with the downward extension and the webs in the same horizontal plane below the plane of engagement with the followers, the said removable member being adapted to be disengaged from the extension and webs by a longitudinal movement without disturbing the followers.

8. A coupler yoke comprising an upper and a lower arm, the upper arm having at its forward end integral downwardly-extending webs, the lower arm being separable from the upper arm, and a connection between the arms at their rear ends, and the lower arm being supported at its forward end by a projection and recess engagement with said webs.

9. A yoke comprising a plurality of parallel arms, connected at their forward ends, and at their rear ends, one connection comprising a transversely removable member, and the other connection comprising a recess and projection engagement, said recess extending longitudinally and being open at one end to permit disengagement of the projection by a relative longitudinal movement of said yoke arms.

10. In a coupler yoke, upper and lower arms, the lower arm having a pulling engagement with a depending portion of the upper arm at one end thereof, depending webs on the opposite end of the upper arm with outward extensions, and flanges on the lower arm, said webs and flanges forming an interlock arranged in horizontal and vertical planes to prevent spreading of the yoke arms and webs.

11. A coupler yoke comprising an upper and a lower arm, the upper arm having at its rear end a depending vertical portion, the lower arm having a vertical bearing face engaging a corresponding face on the vertical portion to provide a pulling engagement between the arms, the vertical portions and the lower arm having registering apertures for a connecting key, and means for securing the opposite ends of the arms together.

12. A coupler yoke having an upper and a lower member, each of said members being equipped with a coupler-engaging gib, the lower member having at its forward end horizontally-extending flanges, and projections on the upper member underlying the flanges and affording a support therefor.

13. A coupler yoke having an upper and a lower arm, each of said members being equipped with a coupler-engaging gib, depending webs on the upper member, and horizontally-extending flanges on the lower member arranged in a horizontal axial plane thereof and lying without the depending webs.

14. A coupler yoke having an upper and a lower member, the upper member having depending webs at its front end and a depending portion at its rear end, the lower member being of T-shape, the arms of the T restraining the webs from outward movement and being at the same time supported by said webs, and the foot of the T being secured to the depending portion at the rear end of the upper member.

ERNEST H. SCHMIDT.

Witnesses:
HARRY E. OORR,
HUBERT L. SPENCE.